Oct. 20, 1964 K. C. ALLEN 3,153,361
TICKET ISSUER

Filed May 22, 1962 4 Sheets-Sheet 1

INVENTOR.
KENNETH C. ALLEN
BY
*Marechal, Biebel, French & Bugg*
ATTORNEYS

Oct. 20, 1964 — K. C. ALLEN — 3,153,361
TICKET ISSUER
Filed May 22, 1962 — 4 Sheets-Sheet 2

INVENTOR.
KENNETH C. ALLEN
ATTORNEYS

Oct. 20, 1964 K. C. ALLEN 3,153,361
TICKET ISSUER
Filed May 22, 1962 4 Sheets-Sheet 3
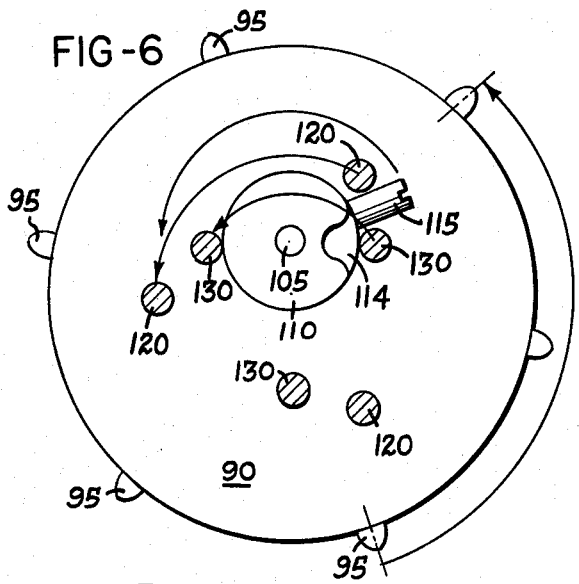
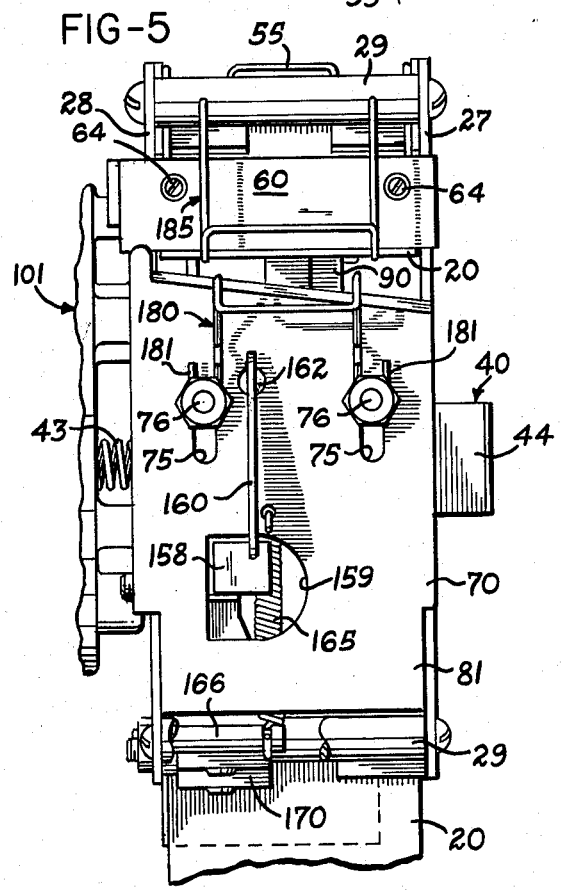
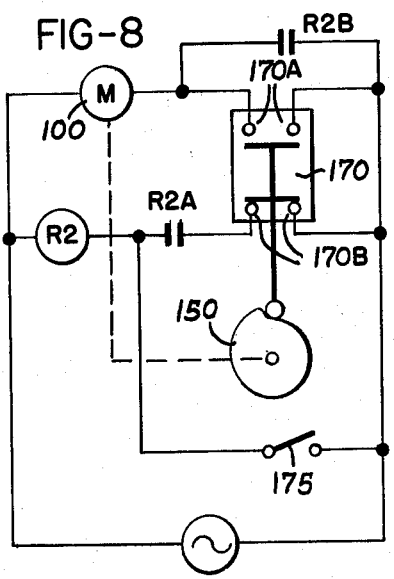
INVENTOR.
KENNETH C. ALLEN
BY
*Marichal, Biebel, French & Bugg*
ATTORNEYS

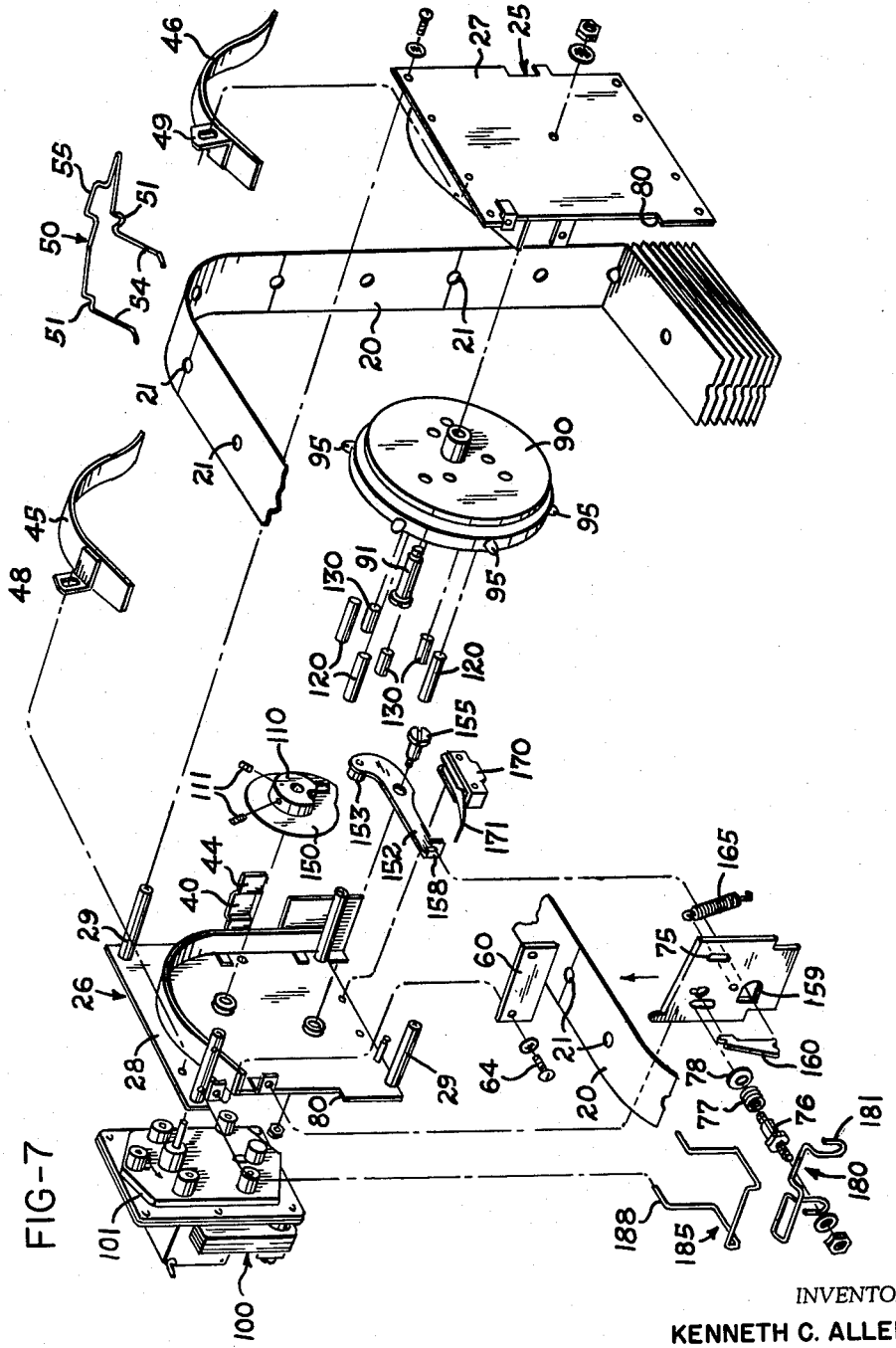

United States Patent Office 3,153,361
Patented Oct. 20, 1964

1

3,153,361
TICKET ISSUER
Kenneth C. Allen, Dayton, Ohio, assignor to The Hobart Manufacturing Company, Troy, Ohio, a corporation of Ohio
Filed May 22, 1962, Ser. No. 196,822
7 Claims. (Cl. 83—203)

This invention relates to ticket issuing mechanism and more particularly to a compact mechanism for advancing a strip of tickets and severing individual tickets from the strip.

The mechanism of this invention is particularly adapted for use where a limited amount of space is available, such as where a ticket issuing mechanism is incorporated within some other device. Therefore, the ticket issuing mechanism of this invention may form part of a weighing scale to issue a single ticket in a cycle of operation for each separate weighing on the scale. The scale preferably includes a circuit operated by movement of the scale platform to control the operation of the ticket issuing mechanism. One such scale including a ticket issuing mechanism control circuit is shown and claimed in the copending application of Allen Serial No. 196,696, filed May 22, 1962, and assigned to the same assignee as this invention.

An important object of this invention is the provision of a compact ticket issuing mechanism which advances a strip of tickets one ticket length and then severs a ticket from a strip while holding the strip against further movement, in a cycle of operation.

A further important object of this invention is the provision of a ticket issuing mechanism having a compact stepping movement which advances a ticket strip during a first portion of a single revolution of a driver and which utilizes the remaining portion of the driver revolution to cut a ticket from the advanced strip.

Another object of this invention is the provision of a compact ticket issuing mechanism incorporating a ticket wheel having a circumference equal to a fixed whole number of ticket lengths, and a drive mechanism for the wheel which effects rotation of the wheel equivalent to a single ticket length in each cycle of operation and then holds the wheel against further rotation.

A further object of this invention is the provision of a compact ticket issuer incorporating a combined intermittent drive mechanism and ticket severing mechanism which operates in a cycle of operation first to advance a ticket strip past a ticket severing station and then to hold the strip against further movement while severing the ticket.

Other objects and advantages of the invention will be apparent from the following description, the accompanying drawings and the appended claims.

In the drawings—

Figure 2:
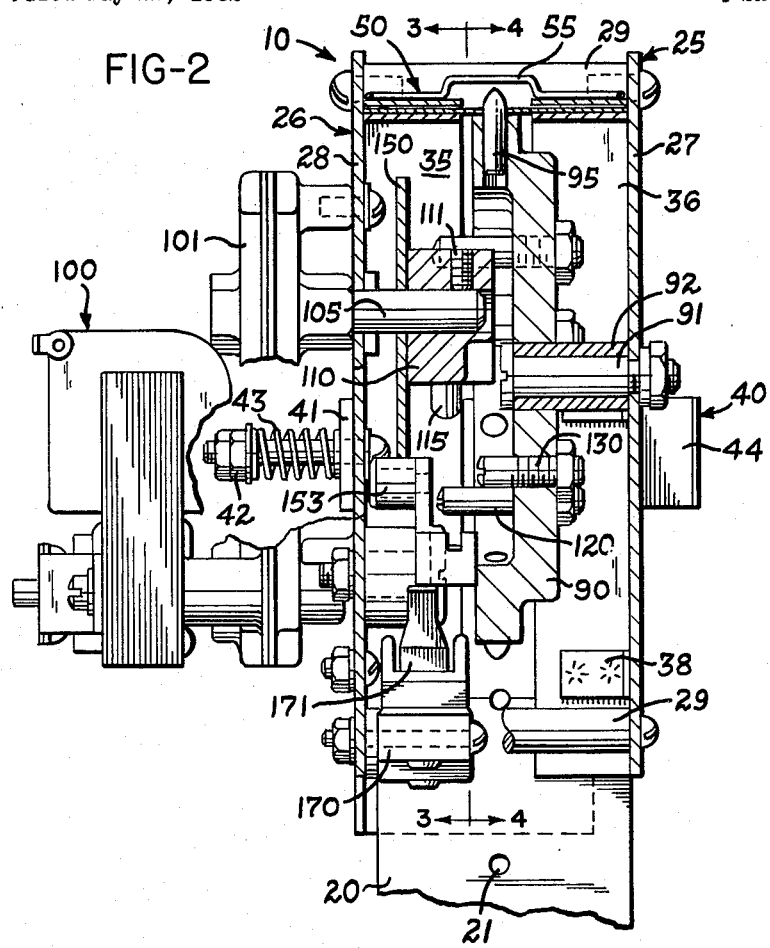
FIG. 2 is an enlarged transverse section, with parts broken away, taken through the ticket issuing mechanism generally along the line 2—2 of FIG. 1.
Figure 3:
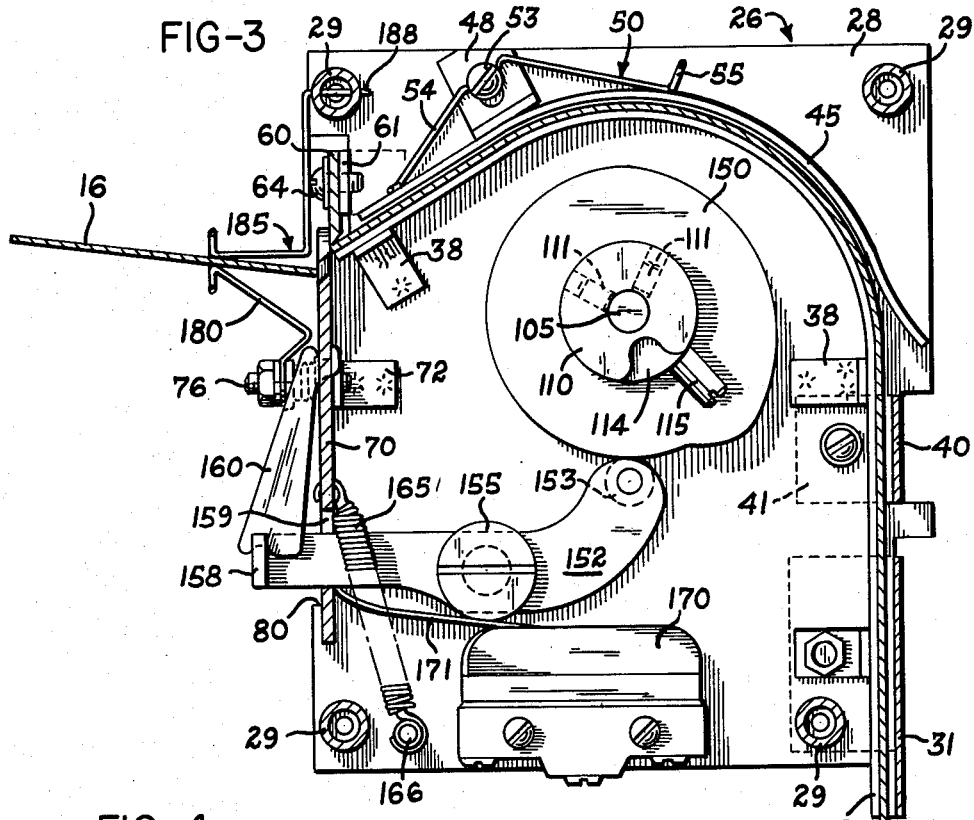
FIG. 3 is a vertical section through the ticket issuing
Figure 4:
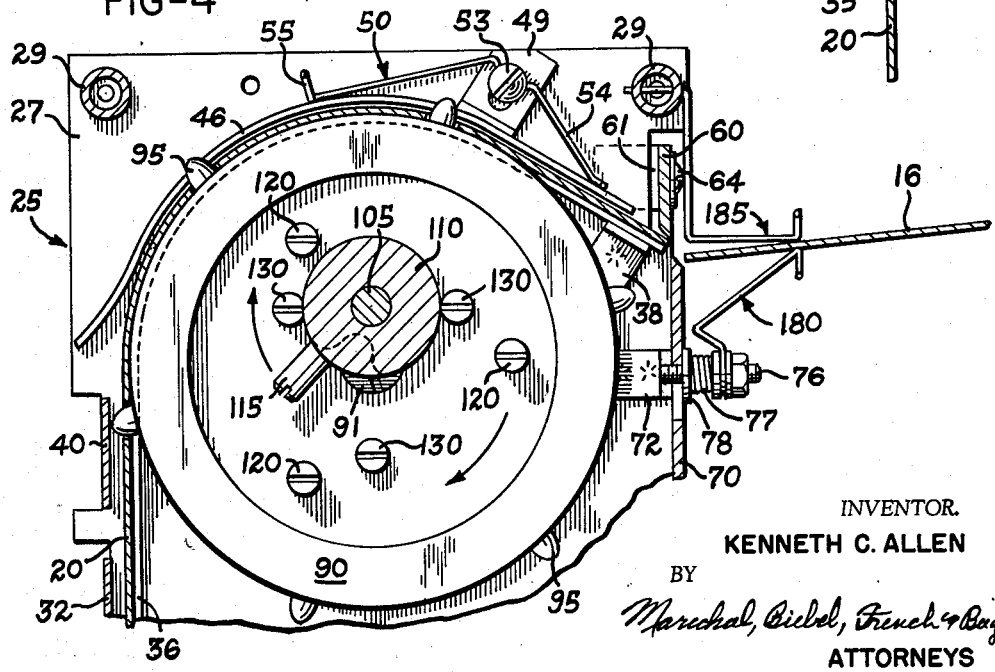

2 mechanism showing the details of the left-hand portion thereof viewed as indicated by the arrows 3—3 of FIG. 2;

FIG. 4 is a further vertical section, similar to FIG. 3, of the right-hand portion of the mechanism viewed as indicated by the arrows 4—4 of FIG. 2;

FIG. 5 is a partially broken away front elevation of the mechanism;

FIG. 6 is a schematic diagram illustrating the relationship of the ticket wheel and the drive hub;

FIG. 7 is an exploded view of the ticket issuing mechanism of this invention with certain parts being omitted in the interest of clarity; and FIG. 8 is an electric control diagram for the mechanism.

Figure 1:
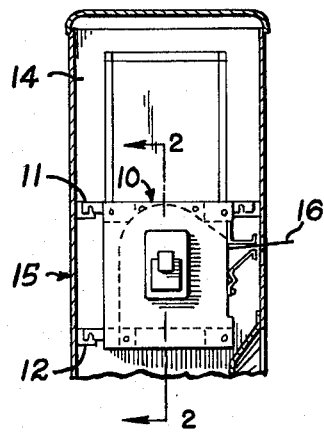
FIG. 1 is a fragmentary vertical sectional view of the upper portion of the column of a person weighing scale showing, in elevation, a ticket issuing mechanism constructed according to this invention incorporated in the scale column.

Referring to the drawings which illustrate a preferred embodiment of the invention, a ticket issuing mechanism constructed according to this invention is illustrated at 10 in FIG. 1 as being mounted on suitable hanger straps 11 and 12 within the vertical column 14 of a person weighing scale 15. The scale 15 is preferably constructed according to the teachings of the above-referenced copending Allen application and incorporates suitable balance mechanism for indicating the weight of a person on the scale. The scale 15 also preferably includes a non-repeat control circuit, as fully described and claimed in the above-mentioned Allen application, which provides a starting signal for the mechanism 10 upon each separate weighing on the scale and which prevents unintentional repeat operations. A portion of this circuit is shown in FIG. 8. The mechanism 10 operates in a cycle of operation upon initiation by the scale control circuit to issue an individual ticket 16 through a suitable aperture formed in the front of the scale cabinet.

Referring to the remaining figures of the drawing, and in particular to FIGS. 3, 4 and 7, a continuous strip 20 of tickets may be formed with longitudinally spaced perforations 21. The strip 20 may be contained as a roll or may be accordion pleated to conserve space, as indicated in FIG. 7.

The body of the ticket issuing mechanism 10 includes two major sub-assemblies, consisting of a left-hand frame assembly 26 (FIG. 3) and a right-hand frame assembly 25 (FIG. 4). The frame assemblies 25 and 26 are respectively formed of stamped sheet metal end plates 27 and 28 to which associated parts are secured, as by spot welding, or rivets, or may be removably held by screws. The plates 27 and 28 are substantially rectangular in shape and are connected to each other and held in spaced relation by spacer studs 29 positioned at the four corners thereof.

The mechanism includes ticket chutes or guides which consist of complementary guide parts secured to each of the frame plates 27 and 28. Thus, the left assembly 26 includes half of a lower or entrance guide 31 which cooperates with a complementary guide 32 on the right frame assembly 25.

Further ticket guide means include a pair of complementary lower ticket guides 35 and 36, one each on each of the frame plates 27 and 28. The lower ticket guides 35 and 36 are secured to their respective frame plates by L-shaped mounting brackets 38 which have an abutting surface spot welded to the plate. These guides 35 and 36 extend upwardly along the back of the mechanism 10 and curve forwardly and terminate at the front edge of the mechanism in a downwardly extending chute portion. The bottommost parts of the lower ticket guides form an entrance chute with the lower entrance guides 31 and 32 through which the ticket strip 20 is threaded for movement in a path upwardly over the top arch or curve defined by the guides 35 and 36 to a cutting station.

Ticket hold down means cooperating with the lower guides 35 and 36 consists of a generally L-shaped ticket hold down plate 40 which has a leg 41 (FIG. 2) held against the outer surface of the left-hand plate 28 by a spring mounting consisting of a retaining bolt 42, fastened to extend outwardly on the plate 28, and supporting a spring 43. The ticket hold down plate 40 extends across the back of the mechanism 10 adjacent an exposed portion of the lower ticket guides 35 and 36 for engagement with the strip 20 at a point above the lower entrance guides 31 and 32.

The plate 40 extends beyond the back of the mechanism 10 with a tab portion 44 (FIG. 2) which may be finger operated to move the plate 40 outwardly when inserting a new strip of tickets. This is particularly important where a whole ticket length may include one or more intermediate perforations, as shown in FIG. 7, and the ticket is printed, requiring that the strip initially be indexed in relation to the advancing mechanism.

Further hold down means consists of a pair of upper ticket guides 45 (FIG. 3) and 46 (FIG. 4) which are curved to conform to the adjacent curve surface of the lower ticket guides 35 and 36. The upper ticket guides 45 and 46 are mounted for limited movement into engagement with the strip 20 by slotted clips 48 and 49 which attach to their respective frame assemblies.

Means for holding the upper ticket guides 45 and 46 against the surface of the strip includes a hairpin-like ticket guide spring 50 which is provided with loop portions 51 on each side thereof for attachment to the opposite plates 27 and 28 by screws 53. The front legs 54 of the hairpin spring 50 engage the upper guides near the front thereof, and a back transverse portion 55 engages the guides rearwardly of their respective mounting clips 48 and 49. The spring 50 urges the guides 45 and 46 into engagement with the paper and may easily be raised by lifting when necessary for cleaning and removing paper accumulations in case of jamming.

The paper advances forwardly to a cutting or severing station at which a fixed knife blade 60 (FIG. 5) is mounted on L-shaped knife brackets 61 (FIGS. 3 and 4) by the pair of knife mounting screws 64. The fixed blade 60 is of a width proportioned to extend across the front edges of the plates of the frame assemblies, as shown in FIG. 5. The mechanism 10 also includes a movable knife 70 which is reciprocally mounted on the front faces or edges of the plates 27 and 28 immediately below the fixed blade 60.

Mounting means for the knife 70 include L-shaped knife brackets 72, one being spot welded on the inside surfaces of each of the plates 27 and 28. The knife 70 is formed with a pair of cooperating laterally spaced parallel slots 75 (FIG. 5) for receiving a pair of knife guide studs 76 which are mounted in extending relation from the brackets 72. A knife spring 77 and washer 78 is assembled on each of the studs 76 and hold the knife inwardly against the front faces of the frame assembly plate and the stationary knife 60.

As shown in FIGS. 3 and 7, the plates 27 and 28 are partially slotted as indicated at 80 to receive the outer edges of the knife 70 and to provide a bearing surface for the reciprocal movement of the knife 70. The knife, itself, has a lower portion 81 of reduced width, as seen in FIG. 5, which is received between the plates 27 and 28 below the slots 80 for vertical guided movement therebetween.

Ticket strip drive means for advancing the ticket strip by one ticket length in a cycle of operation includes a ticket wheel 90 which is rotatably mounted on the right frame assembly 26 on a wheel mounting dowel screw 91 and a sleeve bushing 92 (FIG. 2). The depth or lateral extent of each of the lower ticket guides 35 and 36, and the extent of the cooperating ticket guides 45 and 46, is less than the spaced apart distance of the frame assemblies 25 and 26 to define a space therebetween where a central portion of the ticket strip 20 is exposed for driving by the periphery of the ticket wheel 90.

As shown in FIGS. 2 and 4, the wheel 90 is provided with a plurality of radially extending ticket pins 95 which are proportioned to engage the strip perforations 21 in the space defined between the lower ticket guides 35 and 36, to advance the ticket strip upon the rotation of the wheel 90. The wheel 90 has a circumference which is equal to a whole number of ticket lengths. In the embodiment shown, each ticket includes two of the perforations 21, and the wheel 90 includes six pins, with the circumference of the pins 95 at the projecting portions of the pins 95 being equal to three ticket lengths. The ticket wheel of the preferred embodiment is driven 120° when advancing the strip 20 through one ticket length.

Drive means for the wheel 90 for rotating the ticket wheel to advance the strip 20 one ticket length includes a drive motor 100 which is mounted on the outer surface of the left end plate 28. The motor includes a reduction gear box 101 and an output drive shaft 105 extending from the gear box 101 into the mechanism 10. The center line of the shaft 105 is offset from or eccentric to the axis of rotation of the ticket wheel 90. The motor 100 is preferably of a non-overrunning type, such as the clutch motor Model X-3093-I of Molon Motor & Coil Corporation, 3737 Industrial Avenue, Rolling Meadows, Illinois.

Drive means for the wheel 90 mounted on the shaft 105 includes a drive hub 110 which is secured to the shaft by set screws 111 (FIG. 2). The hub 110 forms a part of an index drive or Geneva type drive for the ticket wheel 90, and is provided with a clearance recess 114 in one side and a radially projecting driving stud 115 (FIG. 3).

Cooperating drive means on the wheel 90 includes a plurality of equally spaced driven pins 120, there being one of each of the pins 120 for each of the whole ticket lengths in the circumference of the wheel 90. Accordingly, in the preferred embodiment, three equally spaced driven pins 120 extend generally axially from the wheel 90, and terminate adjacent the periphery of the drive hub 110, with a length sufficient to be engaged by the stud 115. The pins 120 are positioned on the wheel 90 to be engaged successively by the driving stud 115 during a portion of each revolution of the input shaft 105.

The wheel 90 also includes a plurality of equally spaced indexing pins 130. The pins 130 correspond, in number, to the driven pins 120, and are of a shorter length than the pins 120 to be cleared by the stud 115. The indexing pins 130 are arranged on the wheel 90 to move serially into the clearance opening 114 of the driving hub 110 during the driving of the wheel by the stud 115 for each full revolution of the hub 110.

As seen in FIGS. 4 and 6, the driven pins 120 are mounted equally spaced about the rotational center of the wheel 90 in leading relation to the corresponding indexing or locking pins 130. The outer surface of the hub 110 is correlated with the spacing of the index pins 130 so that at the conclusion of the wheel driving by the stud 115, an adjacent pair of the indexing pins 130 will be engaged with the hub and lock the wheel 90 against further rotation in its advanced indexed position, which corresponds to the length of one of the tickets in the strip of tickets 20.

The indexing drive including the hub 110 and the related index and driven pins on the wheel 90 comprises an intermittent drive means for the ticket wheel which is connected for operation by the motor or driver shaft 105 during each full revolution thereof for effecting ticket advancing rotational movement of the wheel 90. This advancing movement occurs during an initial portion of the single revolution of the shaft 105.

Means for operating the knife 70 substantially at the conclusion of the cycle of operation includes a knife cam 150 mounted on the output shaft 105 immediately behind the hub 110 for rotation therewith. Cam follower means includes a knife lever 152 having a roller 153 mounted on one end thereof (FIG. 3). The lever 152 is pivotally mounted on a dowel screw 155 which is attached to the left frame plate 28.

The lever 152 is provided with a forward end terminating in a flange 158 projecting through a suitable opening 159 (FIG. 5) formed in the knife 70. A knife operating link 160 is provided with opposite forked ends with the lower end thereof received on the flange 158 and the upper end thereof received within an opening 162 formed in the knife 70. A knife retraction coil spring 165 has an upper hooked end secured to the knife and a lower end secured to the left frame assembly 25 on a spring anchor pin 166 (FIG. 3).

Means for causing the motor 100 to operate through a cycle of operation defined by a full circle or 360° turn of the shaft 105 includes a limit switch 170 mounted with its actuating arm 171 in contact with a lower surface of the forward end of the knife lever 152. The limit switch 170 may be of the single-pole, double-throw type, and corresponds to the switch 106 in applicant's copending application, identified above.

Referring to the diagram of FIG. 8, which consists of a portion of FIG. 3 of the copending Allen application, the switch 170 has been illustrated as including two pairs of contacts. One set of contacts 170a are connected to provide power to the motor 100, and a second set of contacts 170b are connected to a control relay R2. Cycle initiating means may include the relay R2 and a switch 175, which corresponds to the switch 82 in the copending Allen application. The switch 175 may be connected for operation by the scale platform, or may be a push button switch, to energize the relay R2 and to initiate operation of the motor 100 through the contacts R2B. The relay R2 then becomes self-holding through relay contacts R2A and switch contacts 170b. As the cam 150 nears the end of its rotation, it operates the switch 170 which preferably has a snap action to break contacts 170b and to close contacts 170a, dropping out relay R2. The conclusion of the cycle of operation is then controlled by the cam 150 and the contacts 170a which assures the completion of the cycle by the motor.

Means for supporting the ticket 16 subsequent to severing thereof by the knife 70 includes a lower wire clip 180 having lower looped ends 181 mounted on the knife guide studs 76. An upper ticket retaining clip 185 has a lower end loop proportioned for engagement with the severed ticket 16 projecting from the cutting station and upper inwardly turned end 188 received within suitable openings formed in the upper front spacer 29.

The operation of the ticket issuing mechanism of this invention may be clearly seen by reference to the diagram of FIG. 6. It is assumed that a ticket strip 20 has been suitably threaded into the mechanism 10, as previously described. When the motor 100 is energized by a suitable external source, such as by a person stepping onto the scale, the drive hub 110 is rotated in a counterclockwise sense when viewed from the end as in FIGS. 3 and 6. The driving pin or stud 115 engages one of the driven pins 120 to initiate rotation of the ticket wheel 90.

As soon as the wheel 90 begins to turn, the following index pin 130 moves into the recess 114 of the hub 110. The stud 115 will continue to drive the wheel 90 through the adjacent pin 120 for approximately one-third of a revolution, at which time the stud 115 will lose its driving contact due to the eccentricity of the mounting of the drive wheel 90 in relation to the shaft 105. However, the hub 110 will continue to drive the wheel 90 until the index pin 130 is moved out of the recess 114. When this occurs, the wheel 90 is locked from further rotation by reason of the engagement of two of the pins 130 with the periphery of the hub 110 as the hub continues to turn. This position of the parts is shown in FIG. 4.

It will therefore be seen that the hub 110 has advanced the strip of tickets by one ticket length which, in this embodiment, has been defined as one-third of the circumference of the ticket wheel 90, and this has been accomplished in approximately one-half a revolution of the drive shaft 105.

As the shaft 105 continues to turn, it can be seen from an examination of FIG. 3 that the roller 153 will begin to ride up the slope of the cam plate 150, thereby initiating upward movement of the knife 70 in a severing stroke past the fixed blade 60. This movement is followed by the retracting movement of the knife as the follower returns down the steep slope of the cam. The severed ticket 16 is now held between the wire clips 180 and 185 for subsequent removal. The cam 150 also operates the limit switch 170 to conclude the cycle of operation, as described above.

It will therefore be seen that this invention provides a compact ticket issuing and severing mechanism which first advances the ticket in the initial portion of a cycle of operation through a ticket drive wheel and then locks the wheel against further rotation while the ticket is being severed during the concluding portion of the cycle of operation. The invention is not limited to the perforated ticket, but may be used with non-perforated tickets, the ticket drive wheel being provided with a suitable gripping surface for engagement with the strip 20. Furthermore, the invention is not limited to a ticket wheel which has a circumference equal to three ticket lengths, as the invention may be readily applied to a wheel which has a circumference equal to some other multiple of ticket lengths, with the number of driven pins and index pins being changed accordingly.

The invention is also not to be limited to a wheel 90 including pins attached thereto. The pins may form an integral part of the wheel, and may assume forms other than cylindrical, provided the form accomplishes the intended result. In a more general sense, the driver pin 115 on the hub 110 and the driven pins 120 on the wheel 90 may be considered as means on the driver and cooperating driven means on the wheel which are mutually engageable during an initial portion of the driver revolution for advancing the wheel 90 corresponding generally to one ticket length, and which became disengaged during the remaining portion of the revolution. Similarly, the outer peripheral surface of the hub 110 and the index pins 130 may be considered respectively as further means on the driver and further cooperating means on the wheel which become mutually engageable during the remaining portion of the driver revolution for restraining the wheel 90 and the strip 20 in the advanced position for the removal of one advanced ticket from the strip.

The invention is applicable to use with other mechanisms, and its compactness and positive operation contribute to its usefulness as a separate or unitary controllable ticket issuing mechanism or connected with other devices such as ticket booths, juke boxes, and the like. The switch 175 of the control circuit may be a manually operated push button or may be the switch blade of a remotely operated relay for either direct or remote ticket issuing control.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A compact ticket issuer for serially issuing tickets from an elongated strip of tickets comprising a body, an imput drive shaft rotatably mounted on said body, a ticket drive wheel rotatably mounted on said body in offset relation to said shaft, means on said ticket wheel engaging said strip for the movement thereof past a cutting station, energizable drive means connected in driving relation to said input shaft to effect a single revolution of said input shaft for each energization thereof, a hub formed on said input shaft and having means defining a clearance recess therein and a wheel driver extending therefrom, a plurality of drive pin means equally spaced on said ticket wheel and successively engageable with said driver during an initial portion of each said revolution of said input shaft, a plurality of indexing pin means corresponding in number to said drive pin means on said ticket wheel and serially movable into said clearance recess during said driving of said wheel in said portion of revolution, and at least two of said indexing pin means being engageable with said hub at the periphery thereof at the conclusion of said portion locking said wheel against further rotation in an advanced indexed position corresponding to the length of one of the tickets in said strip of tickets.

2. A compact ticket issuer for serially issuing tickets from an elongated strip of tickets comprising a body, an input drive shaft rotatably mounted on said body, a ticket drive wheel rotatably mounted on said body in offset relation to said shaft, means on said ticket wheel engaging said strip for the movement thereof past a cutting station, electric drive means connected in driving relation to said input shaft, including control means for effecting one revolution of said input shaft for each energization of said drive means, a hub formed on said input shaft and having means defining a clearance recess therein and a drive pin extending radially therefrom, a plurality of driven pins equally spaced on said ticket wheel and successively engageable with said drive pin during an initial portion of each said revolution of said input shaft, a plurality of indexing pins corresponding in number to said driven pins carried on said ticket wheel and serially movable into said clearance recess during said driving of said wheel in said portion of revolution and at least two of said indexing pins being engageable with said hub at the conclusion of said portion locking said wheel against further rotation in an advanced indexed position corresponding to the length of one of the tickets in said strip of tickets.

3. A compact ticket advancing and cutting mechanism for issuing individual tickets from a continuous strip of said tickets, comprising a body having means defining a ticket chute, a ticket advancing wheel rotatably mounted in said body having means engageable with said strip in said chute for advancement thereof past a severing station, a knife blade mounted on said body at said station for ticket severing movement, motor means for said knife blade and said wheel operable to issue a ticket in a cycle of operation including a hub on said motor means mounted in offset relation to the axis of said wheel, means in said hub defining an index pin receiving notch, a plurality of equally spaced index pins on said wheel serially movable into said notch with the rotation of said hub, a plurality of drive pins equal in number to said index pins mounted on said wheel, driver means on said hub engageable serially with one of said wheel drive pins to effect an incremental revolution of said wheel in the first part of each full revolution of said hub, and knife operating means effective during the remaining part of said revolution to operate said knife blade to sever a ticket at said station.

4. A compact ticket advancing and cutting mechanism for issuing individual tickets from a continuous strip of said tickets, comprising a body having means defining a ticket chute, a ticket advancing wheel rotatably mounted in said body having a radially projecting means engageable with said strip in said chute for advancement thereof past a severing station, the circumference of said wheel being equal to a whole number of ticket lengths, a knife blade mounted on said body at said station for reciprocable ticket severing movement, motor means for said knife blade and said wheel operable to issue a ticket in a cycle of operation including a hub positioned in offset relation to the axis of said wheel, means in said hub defining an index pin receiving notch, equally spaced index pins corresponding in number to said whole number of ticket lengths, said index pins being mounted on said wheel and serially movable into said notch with the rotation of said hub, drive pins on said wheel corresponding in number to said index pins and positioned outwardly of said index pins, driver means on said hub engageable serially with one of said wheel drive pins to effect a one ticket length revolution of said wheel with each full revolution of said hub, and knife operating means effective substantially at the conclusion of said cycle of operation subsequent to the advancing movement of said ticket strip to operate said knife blade to sever a ticket at said station.

5. A compact ticket advancing and cutting mechanism for issuing individual tickets from a continuous strip of said tickets, comprising a body having means defining a ticket chute, a ticket advancing wheel rotatably mounted in said body having means engageable with said strip in said chute for advancement thereof past a severing station, a knife blade mounted on said body at said station for reciprocable ticket severing movement, motor means for said knife blade and said wheel operable to issue a ticket in a cycle of operation including a hub on said motor means mounted in offset relation to the axis of said wheel, means in said hub defining an index pin receiving notch, three equally spaced index pins on said wheel serially movable into said notch with the rotation of said hub, three drive pins on said wheel positioned thereon radially outwardly of said index pins, driver means on said hub engageable serially with one of said wheel drive pins to effect a one-third revolution of said wheel with each full revolutino of said hub, and knife operating cam means on said motor means effective substantially at the conclusion of said cycle of operation subsequent to the advancing movement of said ticket strip to operate said knife blade to sever a ticket at said station.

6. A compact ticket issuing mechanism for advancing a strip of tickets a single ticket length in a cycle of operation, comprising a body, ticket guide means in said body, a ticket drive wheel rotatably mounted on said body having means thereon engageable with said strip for advancing said strip in said guide means upon the rotation thereof, wheel drive means including a driver rotatably mounted on said body for rotation on an axis generally parallel with and offset from the axis of said wheel, means for rotating said driver through approximately a full revolution in a cycle of operation, means on said driver and cooperating driven means on said wheel mutually engageable during an initial portion of said driver revolution for advancing said wheel corresponding generally to one said ticket length and becoming disengaged during the remaining portion of said revolution, further means on said driver and a plurality of angularly spaced index members on said wheel, with a pair of said members becoming mutually engaged with said further means during the remaining portion of said driver revolution restraining said wheel and strip in said advanced position for the removal of said one advanced ticket from said strip.

7. A mechanism for advancing a strip of tickets a ticket length in a cycle of operation comprising a body, guide means on said body for receiving said ticket strip, a ticket wheel rotatably mounted on said body and having thereon means engageable with said strip for advancing said strip upon the rotation thereof, wheel drive and indexing means for rotating said wheel a fraction of a complete revolution to advance said strip a said ticket length in said guide means including wheel drive hub means mounted for rotation on said body in offset relation to said wheel and rotatable a revolution in a cycle of operation, means on said wheel forming a plurality of angularly spaced index members, recess means in said hub means serially receiving one of said index members in each cycle of operation of said hub means, further means on said wheel forming a plurality of angularly spaced drive members, and driver means on said hub means engageable with one of said wheel drive members during a portion of each said cycle of operation for advancing said ticket strip in said guide means concurrently with the movement of one of said index members in said recess means.

References Cited in the file of this patent

UNITED STATES PATENTS

| | | |
|---|---|---|
| 2,103,720 | Helsel | Dec. 28, 1937 |
| 2,795,150 | Seidler | June 11, 1957 |
| 2,808,105 | Krohne | Oct. 1, 1957 |
| 3,010,627 | Lindstrom et al. | Nov. 28, 1961 |

UNITED STATES PATENT OFFICE
CERTIFICATE OF CORRECTION

Patent No. 3,153,361                          October 20, 1964

Kenneth C. Allen

It is hereby certified that error appears in the above numbered patent requiring correction and that the said Letters Patent should read as corrected below.

Column 7, line 1, for "imput" read -- input --; lines 8 and 9, for "defiining" read -- defining --; column 8, line 39, for "revolutino" read -- revolution --; column 10, line 10, for "3,010,627" read -- 3,010,629 --.

Signed and sealed this 23rd day of February 1965.

(SEAL)
Attest:

ERNEST W. SWIDER                                EDWARD J. BRENNER
Attesting Officer                                    Commissioner of Patents